United States Patent
Huang et al.

(10) Patent No.: US 9,583,282 B2
(45) Date of Patent: Feb. 28, 2017

(54) CLUTCH MECHANISM FOR ENERGY STORAGE DEVICE AND GAS INSULATED CIRCUIT BREAKER THEREOF

(71) Applicant: Siemens Aktiengesellschaft, München (DE)

(72) Inventors: Guo Qiang Huang, Guangzhou (CN); Cun Dong Ji, Hangzhou (CN); Yuan Ming Tao, Hangzhou (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/767,333

(22) PCT Filed: Apr. 30, 2014

(86) PCT No.: PCT/EP2014/058815
§ 371 (c)(1),
(2) Date: Aug. 12, 2015

(87) PCT Pub. No.: WO2014/177609
PCT Pub. Date: Nov. 6, 2014

(65) Prior Publication Data
US 2016/0148760 A1    May 26, 2016

(30) Foreign Application Priority Data
May 3, 2013   (CN) .......................... 2013 1 0160896

(51) Int. Cl.
*H01H 3/40* (2006.01)
*H01H 3/58* (2006.01)
(Continued)

(52) U.S. Cl.
CPC ............... *H01H 3/58* (2013.01); *F16D 11/12* (2013.01); *F16H 1/06* (2013.01); *H01H 3/3021* (2013.01);
(Continued)

(58) Field of Classification Search
CPC ...... H01H 3/30; H01H 3/3005; H01H 3/3031; H01H 3/56; H01H 2003/3078; H01H 2003/3084; H01H 2003/3089
(Continued)

(56) References Cited

U.S. PATENT DOCUMENTS 6,967,302 B2 * 11/2005 Peter .................... H01H 3/3021
192/66.1
9,431,186 B2 * 8/2016 Deng ................... H01H 3/3031
(Continued)

FOREIGN PATENT DOCUMENTS

DE   102011005475 A1   9/2012
JP   4767344 B2         9/2011
(Continued)

OTHER PUBLICATIONS

International Search Report PCT/ISA/210 for International Application No. PCT/EP2014/058815 dated Sep. 3, 2014.
(Continued)

*Primary Examiner* — Vanessa Girardi
(74) *Attorney, Agent, or Firm* — Harness, Dickey & Pierce, P.L.C.

(57) ABSTRACT

A clutch mechanism for an energy storage device is disclosed. In an embodiment, the clutch mechanism includes a loading gear, a driving gear, a one-way bearing, a sleeve, and a gear shaft comprising a gear portion and a clutch portion. The gear shaft includes multiple spheres, and a push rod and an elastic element which are located in a cavity of the gear shaft. The push rod includes a groove and can slide in the
(Continued)

axial direction of the gear shaft. A pressure block is fixed to the driving gear, the pressure block being able to push the push rod to slide in the axial direction of the gear shaft, so as to unlock or lock the sleeve and the gear shaft. A gas insulated circuit breaker employing such a clutch mechanism is also disclosed.

13 Claims, 6 Drawing Sheets

(51) Int. Cl.
  *F16D 11/12* (2006.01)
  *H01H 3/30* (2006.01)
  *F16H 1/06* (2006.01)
  *H01H 3/38* (2006.01)
  *H01H 33/28* (2006.01)

(52) U.S. Cl.
  CPC ........... *H01H 3/38* (2013.01); *F16D 2300/24* (2013.01); *H01H 33/28* (2013.01); *H01H 2235/01* (2013.01)

(58) Field of Classification Search
  USPC .............................. 200/501, 400; 335/74, 76
  See application file for complete search history.

(56) References Cited

U.S. PATENT DOCUMENTS

| 2010/0025215 A1 | 2/2010 | Toba et al. |
| 2014/0076851 A1 | 3/2014 | Yano et al. |
| 2016/0240330 A1* | 8/2016 | Huang ................... H01H 3/30 |

FOREIGN PATENT DOCUMENTS

| KR | 100841649 B1 | 6/2008 |
| WO | WO-2013005348 A1 | 1/2013 |

OTHER PUBLICATIONS

Written Opinion of the International Searching Authority PCT/ISA/237 for International Application No. PCT/EP2014/058815 dated Sep. 3, 2014.

* cited by examiner

US 9,583,282 B2

CLUTCH MECHANISM FOR ENERGY STORAGE DEVICE AND GAS INSULATED CIRCUIT BREAKER THEREOF

PRIORITY STATEMENT

This application is the national phase under 35 U.S.C. §371 of PCT International Application No. PCT/EP2014/058815 which has an International filing date of Apr. 30, 2014, which designated the United States of America and which claims priority to Chinese patent application number CN 201310160896.5 filed May 3, 2013, the entire contents of which are hereby incorporated herein by reference.

FIELD

At least one embodiment of the present invention generally relates to a clutch mechanism, in particular to a clutch mechanism for an energy storage device. In addition, at least one embodiment of the present invention generally relates to a gas insulated circuit breaker employing such a clutch mechanism.

BACKGROUND ART

Many kinds of energy storage devices need to operate in conjunction with a clutch mechanism in order to accumulate energy and, when required, release energy. These energy storage devices may for example accumulate potential energy using a spring, and once accumulation of energy is complete, put the clutch mechanism into an unlocked state so as to release energy.

Various types of existing gas insulated circuit breakers used in high-voltage electricity transmission use energy storage devices and clutch mechanisms coordinated therewith; when in a locked state, the clutch mechanism allows the energy storage device to accumulate and store energy. When the clutch mechanism is in an unlocked state, the motive power device will be isolated from the energy storage device, so that the energy accumulated in the energy storage device can be released. Thus the potential energy stored in the energy storage device is converted to kinetic energy, which drives an operating mechanism in the gas insulated circuit breaker to open or close the circuit connected thereto. One existing clutch mechanism employs a ratchet mechanism, wherein the ratchet operates in conjunction with a pawl, and can only rotate in one direction as energy accumulates in the locked state; thus the energy accumulated will not be lost. When the accumulation of energy by the energy storage device is complete, the pawl will achieve mechanical separation of the motive power device and the energy storage device with an arcuate surface on the ratchet, thereby releasing the accumulated energy.

South Korean patent KR100841649B1 has disclosed a withdrawable switchgear for medium-voltage power distribution, wherein a clutch mechanism is used to allow switching between two different modes: manual operation of the trolley and electrical operation of the trolley. The clutch mechanism comprises a driving gear, a driven gear and a lead screw, wherein a switching unit can transfer driven gear torque to the lead screw, or prevent transfer of torque from the driven gear to the lead screw. The switching unit comprises a clutch rod disposed in a handle socket and a clutch ball disposed in a ball socket, as well as an elastic component.

SUMMARY

At least one embodiment of the present invention provides a clutch mechanism for an energy storage device, comprising a loading gear, a driving gear, a one-way bearing, a sleeve, and a gear shaft comprising a gear portion and a clutch portion, wherein the loading gear is connected coaxially to the sleeve via the one-way bearing so as to be rotatable in a single direction, the sleeve is connected coaxially to the clutch portion so as to be rotatable in two directions, and the driving gear is meshed with the gear portion on the outside thereof.

In at least one embodiment, the gear shaft comprises multiple spheres, and a push rod and an elastic element which are located in a cavity of the gear shaft, wherein the clutch portion has multiple holes corresponding to the spheres, and the spheres are located in the holes. The push rod comprises a groove and can slide in the axial direction of the gear shaft, wherein the elastic element is joined to one end of the push rod and presses against the push rod, the depth of the bottom of the groove being less than the diameter of the spheres, and the bottom of the groove having a slope. A pressure block is fixed to the driving gear, the pressure block being able to contact the other end of the push rod and push the push rod to slide in the axial direction of the gear shaft, so as to unlock or lock the sleeve and the gear shaft. The clutch mechanism of the present invention achieves convenient and reliable mechanical isolation of a motive power device from an energy storage device once storage of energy is complete, at a comparatively low cost.

At least one embodiment of the present invention also provides a gas insulated circuit breaker, comprising a motive power device, an operating device, an energy storage device and a clutch mechanism as claimed in any one of the above claims, wherein the loading gear is connected to the motive power device, the driving gear is connected to the energy storage device, and the gear shaft is connected to the operating device. The gas insulated circuit breaker of the present invention, owing to the adoption therein of the clutch mechanism described above, achieves convenient and reliable mechanical isolation of the motive power device from the energy storage device once storage of energy is complete, at a comparatively low cost.

Preferred embodiments are explained below in a clear and easy to understand way with reference to the accompanying drawings, in order to further illustrate the above characteristics, technical features and advantages of the present invention, as well as embodiments thereof.

BRIEF DESCRIPTION OF THE DRAWINGS

The accompanying drawings listed below are intended merely to illustrate and explain the present invention schematically, and do not define the scope thereof.

KEY TO MAIN DEVICE LABELS

Figure 1:
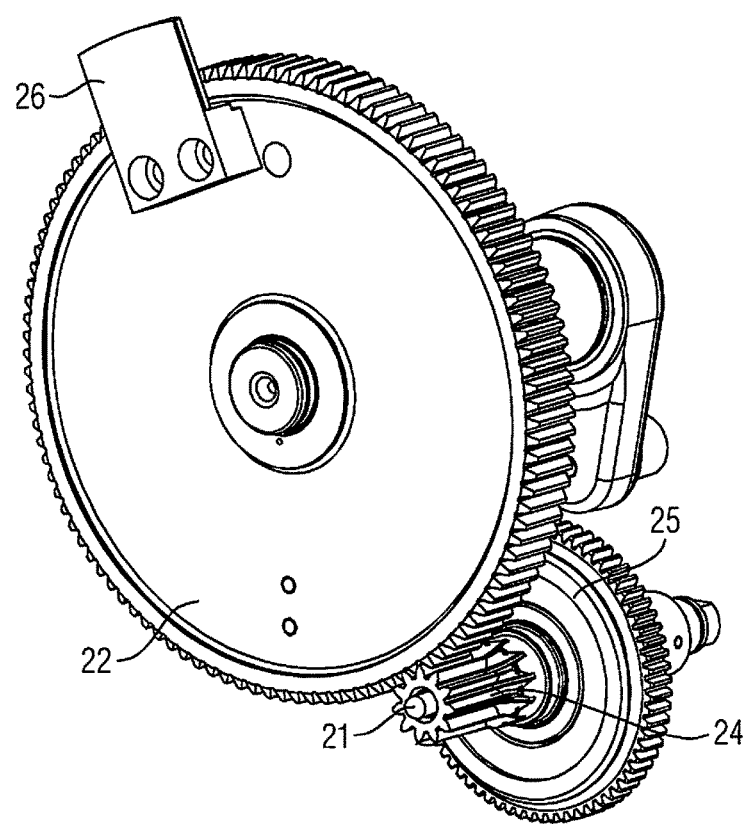
FIG. 1 shows schematically a three-dimensional drawing of the clutch mechanism of the present invention after release of the energy storage device.
Figure 2:
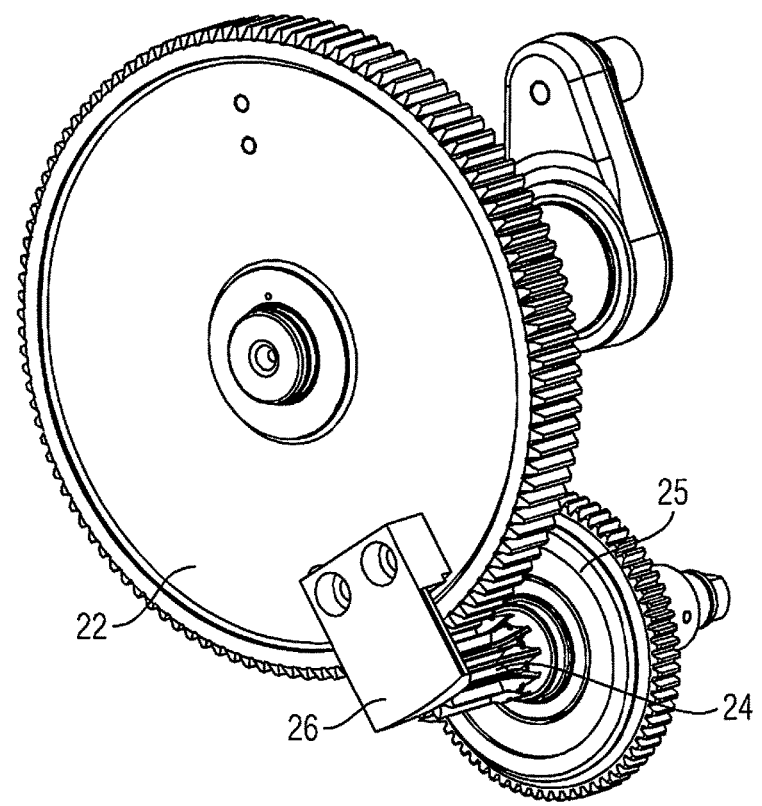
FIG. 2 shows schematically a three-dimensional drawing of the clutch mechanism of the present invention at the instant of release of the energy storage device.
Figure 3:
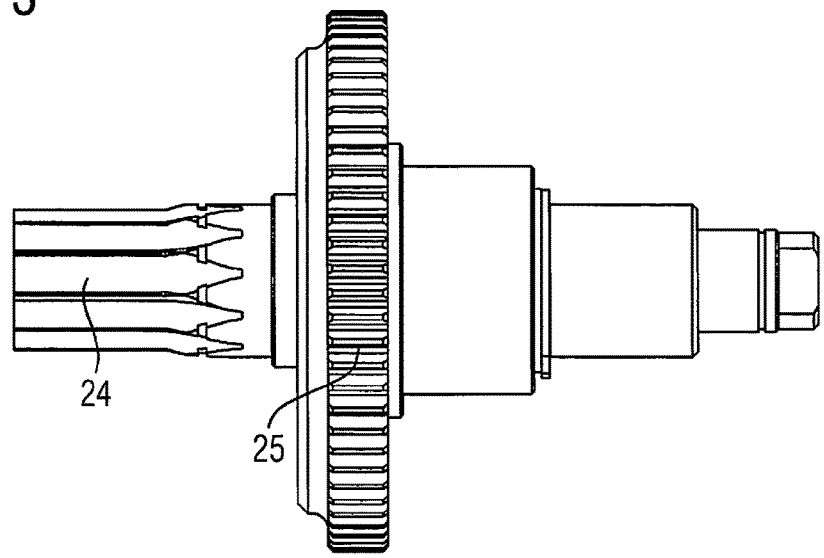
FIG. 3 shows schematically a three-dimensional drawing of the loading gear and the gear shaft connected to each other.

21 push rod
25 loading gear
22 driving gear
26 pressure block
23 one-way bearing
261 sloping face
24 gear shaft
27 sphere
241 gear portion
28 sleeve
242 clutch portion
29 elastic element
100 gas insulated switchgear or circuit breaker
102 motive power device
104 operating device
106 energy storage device

DETAILED DESCRIPTION OF EXAMPLE EMBODIMENTS

At least one embodiment of the present invention provides a clutch mechanism for an energy storage device, comprising a loading gear, a driving gear, a one-way bearing, a sleeve, and a gear shaft comprising a gear portion and a clutch portion, wherein the loading gear is connected coaxially to the sleeve via the one-way bearing so as to be rotatable in a single direction, the sleeve is connected coaxially to the clutch portion so as to be rotatable in two directions, and the driving gear is meshed with the gear portion on the outside thereof.

In at least one embodiment, the gear shaft comprises multiple spheres, and a push rod and an elastic element which are located in a cavity of the gear shaft, wherein the clutch portion has multiple holes corresponding to the spheres, and the spheres are located in the holes. The push rod comprises a groove and can slide in the axial direction of the gear shaft, wherein the elastic element is joined to one end of the push rod and presses against the push rod, the depth of the bottom of the groove being less than the diameter of the spheres, and the bottom of the groove having a slope. A pressure block is fixed to the driving gear, the pressure block being able to contact the other end of the push rod and push the push rod to slide in the axial direction of the gear shaft, so as to unlock or lock the sleeve and the gear shaft. The clutch mechanism of the present invention achieves convenient and reliable mechanical isolation of a motive power device from an energy storage device once storage of energy is complete, at a comparatively low cost.

According to one aspect of at least one embodiment of the present invention, the slope starts off shallow and deepens in the direction in which a pressing force is applied by the elastic element, and when the pressure block pushes the push rod, the spheres fall into the bottom of the groove along the slope.

According to another aspect of at least one embodiment of the present invention, the slope starts off deep and becomes shallower in the direction in which a pressing force is applied by the elastic element, and when the pressure block pushes the push rod, the spheres leave the bottom of the groove along the slope.

According to another aspect of at least one embodiment of the present invention, the sleeve is connected coaxially to the clutch portion via a roller bearing or a sliding bearing so as to be rotatable in two directions.

According to another aspect of at least one embodiment of the present invention, the elastic element is a spring.

According to another aspect of at least one embodiment of the present invention, the slope is arcuate. The arcuate slope helps to achieve fast locking or unlocking of the clutch mechanism.

According to another aspect of at least one embodiment of the present invention, the pressure block comprises a sloping face which can come into contact with the push rod. The sloping face facilitates smooth contact between the pressure block and the push rod.

According to another aspect of at least one embodiment of the present invention, the depth of the bottom of the groove is less than or equal to the radius of the spheres. Setting the depth of the bottom of the groove to be less than or equal to the radius of the spheres helps to prevent the spheres from becoming jammed in the groove.

According to another aspect of at least one embodiment of the present invention, the push rod comprises two said grooves, and the distance between the two grooves in each pair is greater than or equal to the diameter of the spheres.

In order that the technical features, objects and effects of the present invention may be understood more clearly, particular embodiments thereof are now explained with reference to the accompanying drawings. In the drawings, identical labels indicate identical components, or components with similar structures but the same function; moreover, in the case of multiple components with the same structure or function, only one of these is drawn schematically, or only one is labeled. To keep the figures uncluttered, only those parts which are related to the present invention are shown schematically therein, but these do not represent the actual structure of the invention as a product. In this text, "connected" indicates a direct "connection", or "connection" via a third component.

Figure 6:
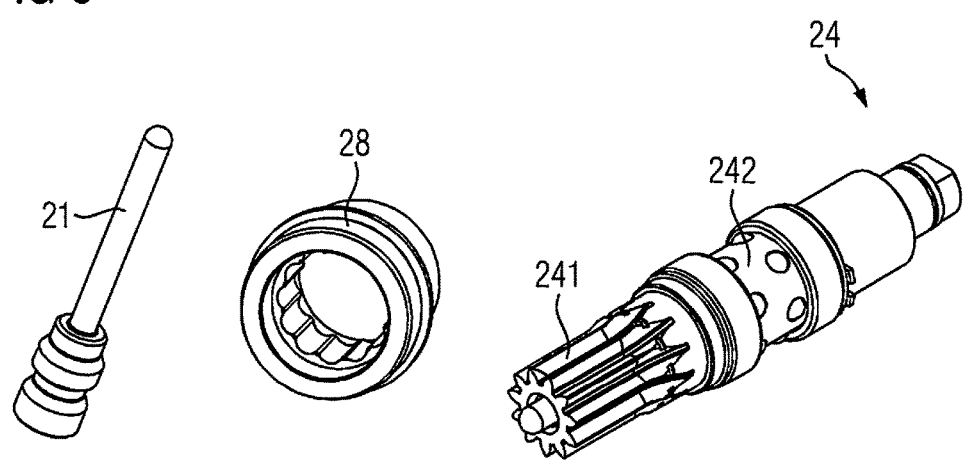
FIG. 6 shows schematically a three-dimensional drawing of the gear shaft, push rod and sleeve of FIG. 3.

As shown in FIG. 1, a clutch mechanism for an energy storage device comprises a loading gear 25, a driving gear 22, a one-way bearing 23, a sleeve 28, and a gear shaft 24 comprising a gear portion 241 and a clutch portion 242 (as shown in FIG. 6), wherein the loading gear 25 is connected coaxially to the sleeve 28 via the one-way bearing 23 so as to be rotatable in a single direction, while the sleeve 28 is connected coaxially to the clutch portion 242 so as to be rotatable in two directions. The driving gear 22 is meshed with the gear portion 241 on the outside thereof. The gear shaft 24 comprises multiple spheres 27, and a push rod 21 and an elastic element 29 which are located in a cavity of the gear shaft 24, wherein the clutch portion 242 has multiple holes corresponding to the spheres 27, and the spheres 27 are located in the holes (as shown in FIG. 6).

The push rod 21 comprises a groove and can slide in the axial direction of the gear shaft 24, wherein the elastic element 29 is joined to one end of the push rod 21 and presses against the push rod 21. The depth of the bottom of the groove is less than the diameter of the spheres 27, and the bottom of the groove has a slope which starts off shallow and deepens in the direction in which the pressing force is applied by the elastic element 29. A pressure block 26 is fixed to the driving gear 22, the pressure block 26 being able to contact the other end of the push rod 21 and push the push rod 21 to slide in the axial direction of the gear shaft 24. When the pressure block 26 pushes the push rod 21, the spheres 27 fall into the bottom of the groove along the slope, so as to unlock the sleeve 28 from the gear shaft 24.

Those skilled in the art will understand that in one embodiment which is not shown, the slope may also be set so as to start off deep and become shallower in the direction in which the pressing force is applied by the elastic element 29. When the pressure block 26 pushes the push rod 21, the spheres 27 leave the bottom of the groove along the slope, so as to lock the sleeve 28 to the gear shaft 24; when the pressure block 26 releases the push rod 21, the spheres 27 fall into the bottom of the groove along the slope, so as to unlock the sleeve 28 from the gear shaft 24. In such an embodiment, the shape of the pressure block must change correspondingly, for example be a ring shape with a gap therein, the size of which gap may correspond to the size of the pressure block 26 in the embodiment shown in the drawings. Those skilled in the art will also understand that the transmission ratio of the driving gear 22 and the gear portion 241 may be selected according to various actual parameters of a motive power device, operating device and energy storage device.

Figure 4:
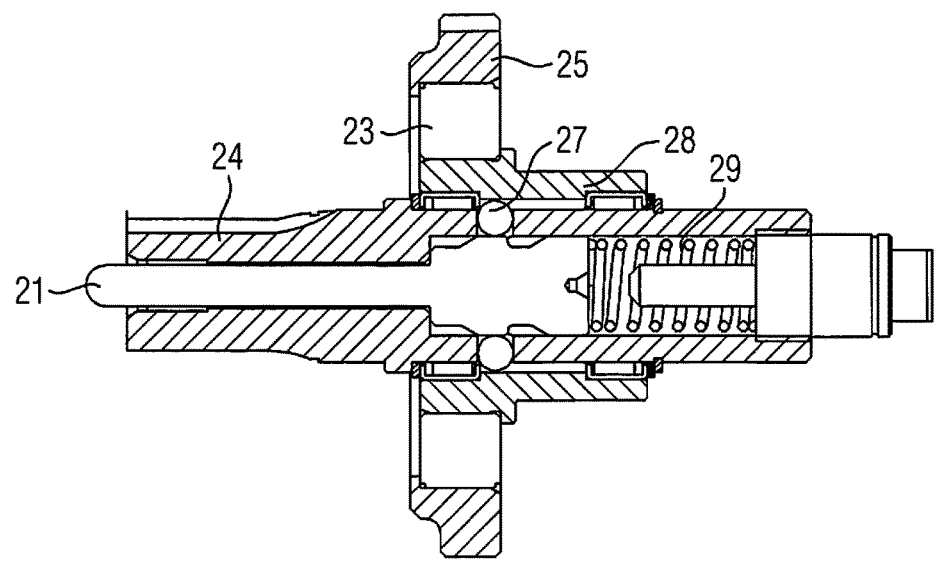
FIG. 4 shows schematically an axial sectional drawing of the loading gear and gear shaft of FIG. 3 in the locked state of FIG. 1.
Figure 5:
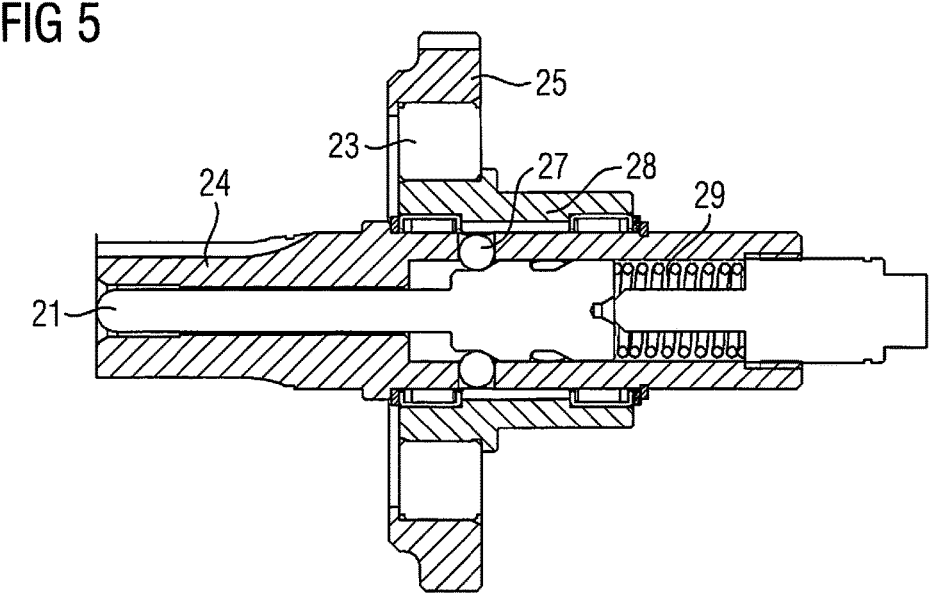
FIG. 5 shows schematically an axial sectional drawing of the loading gear and gear shaft of FIG. 3 in the unlocked state of FIG. 2.

Those skilled in the art will understand that although the sleeve 28 is connected coaxially to the clutch portion 242 via a roller bearing so as to be rotatable in two directions in FIGS. 1 to 8, the sleeve 28 may also be connected via a sliding bearing or be connected directly without a bearing. The loading gear 25 shown in the drawings is connected coaxially to a sleeve 28 via a one-way bearing 23 so as to be rotatable in a single direction. The elastic element 29 is preferably a spring, but may also be another element capable of joining with and pressing against the push rod 21 (as shown in FIGS. 4 and 5). The slope of the groove is preferably arcuate, may be a convex arc shape or a concave arc shape, and may also be a slope with no curvature.

Figure 9:
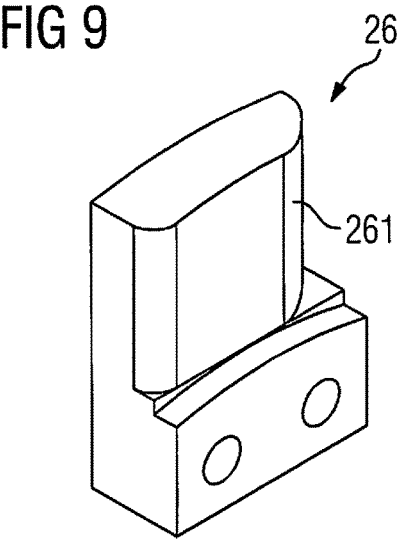
FIG. 9 shows schematically a pressure block with a sloping face.
Figure 10:
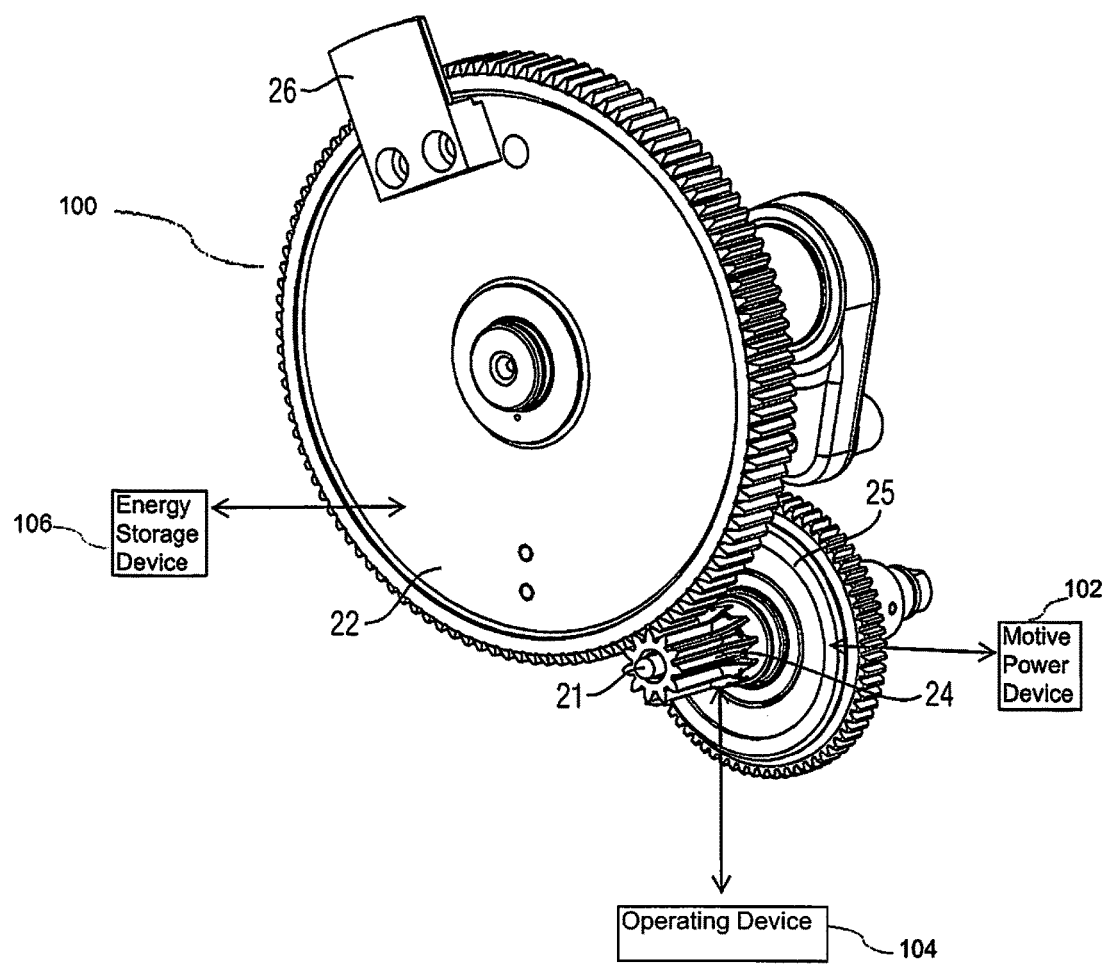
FIG. 10 shows schematically the gas insulated switchgear or circuit breaker.

As FIG. 9 shows, the pressure block 26 comprises a sloping face 261 which can come into contact with the push rod 21. Setting the depth of the bottom of the groove in the push rod 21 to be less than or equal to the radius of the spheres 27 helps to prevent the spheres 27 from becoming jammed in the groove. Those skilled in the art will understand that although the push rod 21 comprises two grooves in FIGS. 1 to 6, it may also have one groove or more than two grooves. The distance between the two grooves in each pair is greater than or equal to the diameter of the spheres 27, but may also be less than the diameter of the spheres 27, as long as the part of the push rod 21 between the two grooves in each pair has sufficient strength to support the spheres and the spheres in two adjacent grooves do not interfere with each other.

Figure 7:
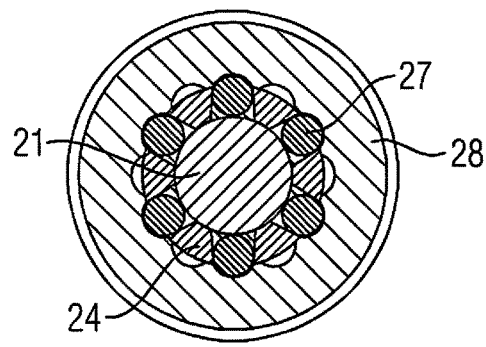
FIG. 7 shows schematically a radial sectional drawing of the push rod, gear shaft and sleeve in the state shown in FIG. 4.
Figure 8:
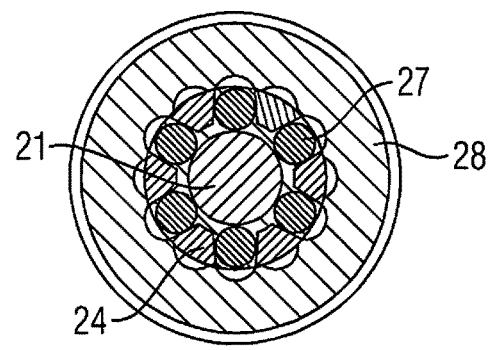
FIG. 8 shows schematically a radial sectional drawing of the push rod, gear shaft and sleeve in the state shown in FIG. 5.

According to one embodiment which is not shown, the gas insulated switchgear or circuit breaker 100 of the present invention comprises a motive power device 102, an operating device 104, an energy storage device 106 and the clutch mechanism described above, wherein the loading gear 25 is connected to the motive power device, the driving gear 22 is connected to the energy storage device, and the gear shaft 24 is connected to the operating device. Once the energy storage device is released, the clutch mechanism is in the position shown in FIGS. 1, 4 and 7. The elastic element 29 is joined with one end of the push rod 21 and presses against the push rod 21; as shown in FIG. 4, the push rod 21 presses against an inner wall of the cavity of the gear shaft 24, while the spheres 27, as shown in FIG. 7, are in simultaneous contact with the inside of the sleeve 28 and the outside of the push rod 21, thereby locking the sleeve 28 to the gear shaft 24, so that rotation of the sleeve relative to the gear shaft is prevented. At this point, if a source of motive power such as an electric motor is used to turn the loading gear 25, the gear shaft 24 will be driven in synchronous rotation, so as to convert kinetic energy to potential energy in the energy storage device connected to the driving gear 22, wherein the one-way bearing 23 ensures that the stored energy will not be released during the loading process. At the same time, the driving wheel 22 will rotate in synchrony due to the fact that it is meshed with the gear portion 241, while the pressure block 26 will also rotate in synchrony due to the fact that it is fixed to the driving gear 22. Once storage of energy is complete, and the pressure block 26 rotates to the position shown in FIGS. 2, 5 and 8, the sloping face 261 will push the push rod 21, which presses against the elastic element 29 as shown in FIG. 5 so that the spheres 27 fall into the groove in the push rod 21, thereby breaking contact between the spheres 27 and the sleeve 28 as shown in FIG. 8, and enabling mechanical isolation of the energy storage device from the loading gear 25. At this point, an operation to release the stored energy can be performed. During the process of energy release, the driving gear 22 and pressure block 26 rotate in synchrony, and the driving gear 22 will turn the gear shaft 24. After rotating through a suitable angle, the pressure block 26 fixed to the driving gear 22 will leave the push rod 21, at which point the push rod 21 is reset at a suitable position under the combined action of the elastic element 29, the spheres 27 and the sleeve 28. After resetting, the gear shaft 24 continues to rotate and will drive the one-way bearing 23 in coaxial rotation, until all the energy has been released, and finally induces the operating device to close the circuit. Those skilled in the art will understand that the position in which the pressure block 26 is fixed to the driving gear 22, as well as the size of the pressure block, may be selected according to the requirements of the design parameters.

It should be understood that although description is carried out herein in terms of various embodiments, it is certainly not the case that each embodiment comprises just one independent technical solution. This method of presentation is employed herein purely for the sake of clarity. Those skilled in the art should take the Description as a whole; the technical solutions in each embodiment may also be suitably combined to form other embodiments capable of being understood by those skilled in the art.

In this text, "schematic" means "serving as a real example, an instance or an illustration", and no drawing or embodiment described herein as "schematic" should be interpreted as a more preferential or more advantageous technical solution.

The embodiments described above are merely particular schematic embodiments of the present invention, and are not intended to define the scope thereof. Any equivalent changes, amendments or combinations made by those skilled in the art without departing from the concept and principle of the present invention should fall within the scope of protection thereof.

The invention claimed is:

1. A clutch mechanism for an energy storage device, comprising:
    a loading gear;
    a driving gear;
    a one-way bearing;
    a sleeve;

a gear shaft including a gear portion and a clutch portion, wherein the loading gear is connected coaxially to the sleeve via the one-way bearing so as to be rotatable in a single direction, the sleeve is connected coaxially to the clutch portion so as to be rotatable in two directions, and the driving gear is meshed with an outside of the gear portion, the gear shaft further including multiple spheres, and a push rod and an elastic element located in a cavity of the gear shaft, wherein the clutch portion includes multiple holes corresponding to the spheres, and the spheres are located in the holes, and the push rod including a groove and being slideable in the axial direction of the gear shaft, wherein the elastic element is joined to one end of the push rod and presses against the push rod, the depth of the bottom of the groove being less than the diameter of the spheres, and the bottom of the groove including a slope; and a pressure block, fixed to the driving gear, the pressure block being able to contact the other end of the push rod and push the push rod to slide in the axial direction of the gear shaft, so as to unlock or lock the sleeve and the gear shaft.

2. The clutch mechanism of claim 1, wherein the push rod comprises two said grooves, and the distance between the two grooves in each pair is greater than or equal to the diameter of the spheres.

3. A gas insulated circuit breaker, comprising:
a motive power device;
an operating device;
an energy storage device; and
the clutch mechanism of claim 1, wherein the loading gear is connected to the motive power device, the driving gear is connected to the energy storage device, and the gear shaft is connected to the operating device.

4. The clutch mechanism of claim 1, wherein the slope starts off deep and becomes shallower in the direction in which a pressing force is applied by the elastic element, and when the pressure block pushes the push rod, the spheres leave the bottom of the groove along the slope.

5. The clutch mechanism of claim 4, wherein the sleeve is connected coaxially to the clutch portion via a roller bearing or a sliding bearing so as to be rotatable in two directions.

6. A gas insulated circuit breaker, comprising:
a motive power device;
an operating device;
an energy storage device; and
the clutch mechanism of claim 4, wherein the loading gear is connected to the motive power device, the driving gear is connected to the energy storage device, and the gear shaft is connected to the operating device.

7. The clutch mechanism of claim 1, wherein the slope starts off shallow and deepens in the direction in which a pressing force is applied by the elastic element, and when the pressure block pushes the push rod, the spheres fall into the bottom of the groove along the slope.

8. A gas insulated circuit breaker, comprising:
a motive power device;
an operating device;
an energy storage device; and
the clutch mechanism of claim 7, wherein the loading gear is connected to the motive power device, the driving gear is connected to the energy storage device, and the gear shaft is connected to the operating device.

9. The clutch mechanism of claim 7, wherein the sleeve is connected coaxially to the clutch portion via a roller bearing or a sliding bearing so as to be rotatable in two directions.

10. The clutch mechanism of claim 9, wherein the elastic element is a spring.

11. The clutch mechanism of claim 9, wherein the slope is arcuate.

12. The clutch mechanism of claim 9, wherein the pressure block comprises a sloping face, contactable with the push rod.

13. The clutch mechanism of claim 9, wherein the depth of the bottom of the groove is less than or equal to the radius of the spheres.

* * * * *